United States Patent [19]

Reichert et al.

[11] Patent Number: 5,270,128
[45] Date of Patent: Dec. 14, 1993

[54] AIR ASSISTED ALKALINE CELL

[75] Inventors: Samuel F. Reichert, Brunswick; Gary L. Thrasher, Bay Village, both of Ohio

[73] Assignee: Eveready Battery Company, Inc., St. Louis, Mo.

[21] Appl. No.: 863,277

[22] Filed: Apr. 3, 1992

[51] Int. Cl.$^5$ .................. H01M 2/16; H01M 12/06
[52] U.S. Cl. .................................. 429/29; 429/86; 429/134; 429/137; 429/249
[58] Field of Search ............... 429/29, 53, 86, 134, 429/139, 212, 247, 249

[56] References Cited

U.S. PATENT DOCUMENTS

| | | | |
|---|---|---|---|
| 3,741,812 | 6/1973 | Spellman et al. | 429/53 |
| 3,837,921 | 9/1974 | Henssen | 429/86 X |
| 3,869,314 | 3/1975 | Gillespie | 429/86 |
| 4,078,124 | 3/1978 | Prentice | 429/144 |
| 4,777,100 | 10/1988 | Chalilpoyil | 429/212 X |
| 4,885,218 | 12/1989 | Andou et al. | 429/53 |
| 5,049,457 | 9/1991 | Niksa et al. | 429/29 |

OTHER PUBLICATIONS

CEGASA International, Engineering Manual, Cegasa Air-Alkaline Primary Batteries with Self-Recharging Feature; published prior to Aug. 30, 1984.

*Primary Examiner*—Stephen Kalafut
*Attorney, Agent, or Firm*—Robert W. Welsh

[57] ABSTRACT

An air-assisted alkaline cell having a zinc-containing anode encased within a closed end cylindrical shaped separator (such as cellophane) that is substantially permeable to hydrogen and substantially nonpermeable to the cell's electrolyte, and having a gel coating (such as starch) deposited on the exposed area of the anode within the separator so that the electrolyte in the anode will be substantially entrained within the separator/gel coating compartment while hydrogen will be free to exit the separator/gel coating compartment.

20 Claims, 2 Drawing Sheets

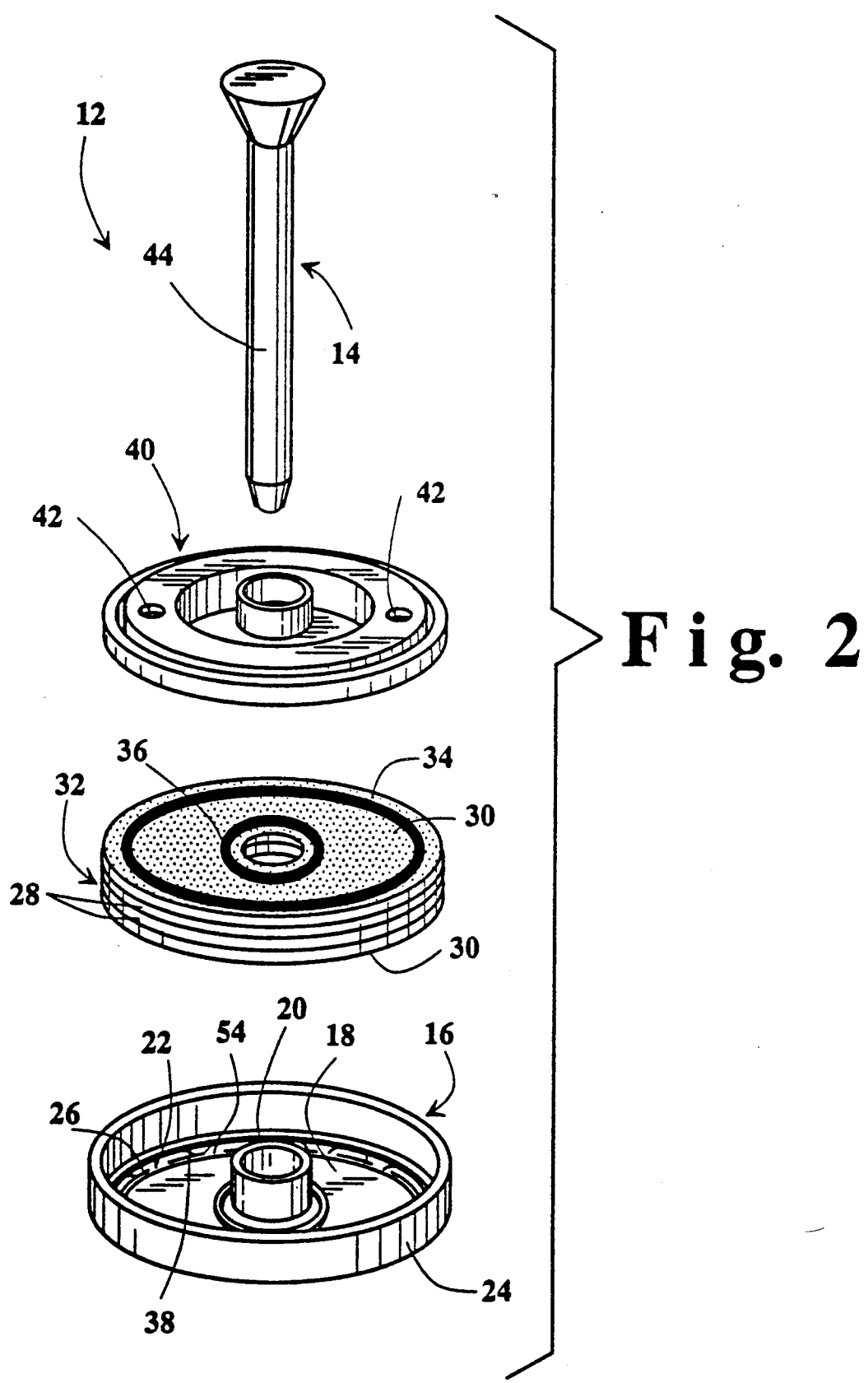

AIR ASSISTED ALKALINE CELL

FIELD OF THE INVENTION

The invention relates to an air assisted alkaline cell having an anode enclosed within a cylindrical shaped separator that is substantially permeable to hydrogen and substantially nonpermeable to the electrolyte in the anode. Preferably a coating of a gel is disposed on the top exposed area of the anode encased by the separator so as to retain the electrolyte within the confines of the separator while permitting any hydrogen generated by the anode to escape such confines.

BACKGROUND OF THE INVENTION

Alkaline cells are well known in the art and generally employ a zinc anode, manganese dioxide as the cathode with an aqueous solution of potassium hydroxide for the electrolyte. These cells are readily available commercially for industrial and home applications. Recently a new type of alkaline cell was disclosed by Cegasa International, a Spanish company. This cell, referred to as an air-assisted cell, employs zinc as the anode and manganese dioxide as the cathode with an aqueous solution of potassium hydroxide as the electrolyte. This cell is designed so that the positive electrode containing the manganese dioxide ($MnO_2$) is supported about its periphery and along its full length in the cell by a perforated ribbed air distribution grid. The bottom or negative end of the cell has an insulating support which allows air to enter the cell and pass up along the outside of the supported positive electrode. When the cell is initially put into a circuit, the electrochemical reaction depends primarily upon the presence of the manganese dioxide cathode. As the reaction progresses, and the manganese dioxide cathode is electrochemically reduced, air within the cell reoxidizes and recharges the manganese dioxide. Thus an air-assisted cell is designed to use oxygen in the air to "recharge" manganese dioxide in the cathode. This "recharging" of the manganese dioxide means that the fixed quantity of manganese dioxide in the cathode can be discharged and then recharged numerous times. In contrast, the cathode's ampere hour output in a standard alkaline battery is limited by the quantity of manganese dioxide incorporated in the cell when the cell is manufactured. Therefore, based upon the cathode's ampere hour input, the maximum service obtainable from an air-assisted alkaline battery is greater than the maximum service which can be obtained from a comparably sized standard alkaline battery. The need to get oxygen to the manganese dioxide in an air-assisted alkaline cell means that a portion of the battery, such as the seal, must be designed to allow oxygen to flow through and directly contact the cathode. Contrary to this, the seal in regular alkaline cells is designed to be air tight.

Standard alkaline batteries and air-assisted alkaline batteries have traditionally been made with mercury in the anode. Mercury helped to prevent gassing by raising the hydrogen overvoltage. Due to concerns about the environment, battery manufacturers are designing alkaline batteries with little or no mercury. In the hermetically sealed alkaline batteries, gassing can be contained because the cell is sealed. However, the "open" design of air-assisted alkaline cells prevents containment of gas within the cell. As the percentage of mercury in the cell has been reduced, Problems with leakage and decreased shelf life have become apparent. The reduction or elimination of mercury has led to service and shelf problems because gassing in the anode compartment has forced electrolyte to flow from the anode compartment into the cathode compartment. As electrolyte moves from the anode into the cathode, ionic conductivity in the anode decreases and the cell cannot discharge efficiently. At the same time, pores in the cathode become flooded thereby preventing oxygen from contacting and recharging the manganese dioxide. A severe drop in the cell's service is the net result. If the anode compartment continues to gas and drive electrolyte from the anode and into the cathode, then the electrolyte may eventually be driven through the seal and out of the air access opening in the cover.

It is an object of the present invention to provide an air-assisted cell with improved leakage characteristics while maintaining good service and shelf performance.

It is another object of the invention to provide means for releasing hydrogen from an air-assisted cell prior to unacceptable pressure buildup within the cell and means to retain the anode's electrolyte within the confines of a separator encasing the anode.

It is another object of the present invention to provide an air-assisted cell, having reduced or no mercury in the anode, with good service and shelf performance and which is easy to make and cost effective to produce.

The above and further objects will become apparent upon consideration of the following description and drawings thereof.

SUMMARY OF THE INVENTION

The invention relates to an air-assisted cell comprising an anode, a cathode and an electrolyte assembled within a conductive container closed by and electrically insulated from a cover having at least one opening and said cover associated with a film being porous to permit air from the opening in the cover to pass through into the cell and prevent electrolyte from passing out through the at least one opening in the cover during normal storage and operating conditions; said cathode disposed within and electrically connected to the container and defining an opening in said cathode; a separator member disposed within said opening of and contacting said cathode and defining an opening in said separator; said anode disposed within said opening in the separator with the separator extending above the anode and wherein said separator is permeable to hydrogen and substantially nonpermeable to the electrolyte such that when the separator is placed within a 2.76 inch inside diameter tube to a thickness of 0.0045 inch filling the cross-section of the tube, 50 cubic centimeters of a 37% potassium hydroxide solution placed on one side of the separator will take more than 5 minutes, preferably more than 8 minutes, to pass through the separator when a vacuum of 750 mm Hg is applied to the other side of the separator.

The test requirement will insure that only materials having the characteristics required to pass the test will be suitable for use in the subject invention to encase the anode of the cell. The separator material must also allow for sufficient ionic conductivity between the anode and cathode and therefore it must be slightly permeable to the electrolyte. The separator has to be permeable to hydrogen which can be generated within the anode of the cell. The separator should be able to pass air at a rate of at least 2.5 cubic centimeters per 5 seconds through a 0.1 square inch area of the separator at a pressure of 2.5 inches of water over said 0.1 square inch area of the separator. This air test can be done on a conventional test apparatus known in the art as a "Gurley Densometer". Thus, the separator must be permeable to hydrogen and substantially nonpermeable to the electrolyte in the anode. Suitable separator materials are cellophane, nylon, rayon, polyvinyl alcohol (PVA) and cellulose. Specific brands of suitable cellophane are BCL Cellophane which is a trade name for cellophane by Courtaulds Films of Somerset, England and Acropor which is a trade name for cellophane by Gelman Sciences of Ann Arbor, Mich., U.S.A. The separator material could be a single layer or composed of two or more layers depending on the construction and components of the cell. In most applications, the thickness of the separator could be from about 0.003 to about 0.010 inch thick., preferably from about 0.004 to about 0.008 inch thick.

A preferred method of determining whether a separator material has the characteristics required of the separator of this invention is a bench top test designated as the Buchner Funnel Test. Specifically, the separator of this invention must have the ability to substantially resist the passage of electrolyte while allowing for sufficient ionic conductivity between the anode and the cathode. A suitable test would use a conventional Buchner funnel with a 2.76 inch inside diameter for the tube portion of the funnel to determine the period of time required to pass 50 cubic centimeters of a 37% KOH solution through a sample of the separator material. A vacuum of approximately 750 mm Hg is applied to the separator on one side of the funnel while the 37% KOH solution is contained in the other side of the funnel. The time to force the solution through the separator can then be observed. For a sample of a 0.0045 inch thick separator of this invention, the time would have to be more than 5 minutes, and preferably more than 8 minutes for it to have the characteristics required for this invention.

Preferably, a gel material could be placed on the top exposed area of the anode so that in cooperation with the separator, the anode would be completely encased. The gel material could be applied by any conventional method and form a top coat for the anode. A primary function of the gel top coat is substantially to prevent the oxygen that enters the cell from contacting the anode. The gel top coat should preferably be nonpermeable to the anode's electrolyte and at least slightly permeable to hydrogen so that hydrogen could pass through the top coat and fill any volume that may exist between the cell's cover and the gel top coat where it can then proceed to exit through the opening in the cover. Suitable gel materials would be French potato starch, grain starch, polymethacrylic acid, polyacrylic acid and salts of polyacrylic acid. Potato starch is a preferable material for the top coat since it has cohesiveness that enables it to remain in place regardless of the cell's orientation and it tends to flow to fill any opening that occurs when a conventional collector is pushed through the top coat into the anode mix. Thus the gel top coat cooperates with the separator to form a barrier against oxygen ingress into the anode by completely covering the top exposed area of the anode. The gel should also contact the inside surface of the separator above the anode.

In air-assisted alkaline cells with reduced mercury in the anode, preferably reduced to 3% or less by weight of the zinc and more preferably completely removed so that no mercury is added to the anode, a surfactant could be added to the anode to facilitate the dispersement of hydrogen from the anode mix. The surfactant should be added in an effective amount so that it will decrease the surface tension of the anode's electrolyte so that hydrogen gas generated at the collector and/or surface of the zinc is able to move to the anode/separator interface and/or the anode/gel top coat interface prior to an unacceptable buildup of pressure in the anode compartment defined by the separator and gel top coat. Thus when the hydrogen is dispersed to the surface of the anode mix, it will permeate through the separator and/or gel top coat thereby preventing pressure buildup within the cell. The hydrogen exiting the anode compartment can then proceed to exit through the opening in the cover. Suitable surfactant materials for use in this invention include polyethylene glycol and its derivatives. Preferably a surfactant sold under the trade name Triton X-100 by Union Carbide Corporation could be used in most cell applications. Triton X-100 is a 1,1,3,3-tetramethylbutylphenoxypolyethylene glycol having the following formula:

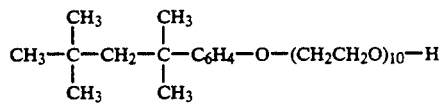

Preferably an amount of the surfactant to be added could be from 50 to 10,000 parts per million (ppm) based on the weight of the zinc, and most preferable from 300 to 700 ppm. Optionally, one or more organic corrosion inhibitors and/or one or more inorganic corrosion inhibitors can be added to the anode.

Preferably a cover seal assembly of the type disclosed in U.S. patent application Ser. No. 784,337 filed on Oct. 29, 1991 now U.S. Pat. No. 5,229,223, can be used with this invention. Specifically the cover seal assembly comprises an organic Polymeric seal member having a base with at least one opening and top and bottom films having substantially the same melting temperature with an inner layer therebetween, then by welding one or more selected areas, an integral bond can be formed through an inner layer of film which has a higher melting temperature. In other words, at the selected areas the heat from the welding will melt the top and bottom films which will then permeate the inner layer of film so that upon cooling an integral bond will form through the inner layer. The top and bottom films are preferably polypropylene films while the inner film is preferably a polytetrafluoroethylene film. It is preferred that the top and bottom plastic films be made of the same material so that upon being heated, such as by ultrasonic welding, the films will have the same melting temperature so that at selected areas of the weld, the films will melt and then solidify forming an integral bond through the inner films. It is also preferred to have the melting temperatures of the top and bottom films lower than the melting temperature of the inner film so as to prevent the inner film from melting during the heat bonding step. A suitable top or bottom film can be obtained commercially from Hoechst Celanese Corp., of Somerville, N.J. under its trademark Celgard 4400. This film is a polypropylene film that is made by heat bonding a three mils thick open mesh of polypropylene to a solid one mil thick layer of polypropylene. The open mesh provides structural strength to the film while the one mil thick layer is available for bonding to another polypropylene surface.

The inner film has to be porous to air and preferably constructed with a series of interconnected crevices and/or small pores that will enable a flowable material, such as melted polypropylene, to preferably traverse from one side to the other side of the film. The size of the crevices and/or pores can be controlled to inhibit the flow of selected gases and/or liquids. The preferred inner film is polytetrafluoroethylene. In the preferred embodiment, the inner film will have a higher melting temperature than the top and bottom films so that during the heat bonding of the multilayer film, the inner film will not melt causing the pores to collapse and thereby prevent the flow of the melted top and bottom films to the interior of the inner film so as to prevent an integral bond from being formed between the top and bottom films. An integral bond is one that is obtained between a flow of the melted top and bottom film together and then solidifying the films in a selected area into a solid unit.

The thicknesses of the top and bottom films can vary depending upon the particular size and cell system used. For most applications, the thicknesses of the top and bottom films can be from 0.5 mil to 6 mils thick, and most preferably from 1 mil to 4 mils thick. The inner film can be one or more layers with each layer being from 1 mil to 10 mils thick, most preferably from 3 mils to 5 mils thick.

A preferred embodiment of the seal assembly would comprise a polymeric seal member having a base, a central opening defined by a centrally upstanding wall, a peripheral upstanding skirt and having at least one opening in the base to permit air to flow into the cell. The multilayer plastic film could be designed with an opening at its center to accommodate the centrally upstanding wall so that it could be disposed onto the base member between the centrally upstanding wall and the peripheral skirt. The multilayer film area near the peripheral upstanding skirt and the multilayer film area near the centrally upstanding wall could be heat bonded using conventional techniques such as ultrasonic welding. By bonding these areas, a secured multilayer film seal member is formed. A neutral cover having at least one opening could be placed over the multilayer film and then an external cover with at least one opening could be placed over the neutral cover and secured to the container of the cell through the use of the peripheral skirt of the seal member.

BRIEF DESCRIPTION OF THE DRAWINGS

FIG. 2 is an exploded view of the subassembly used in assembling the cell of FIG. 1.

DETAILED DESCRIPTION OF THE PREFERRED EMBODIMENTS

Figure 1:
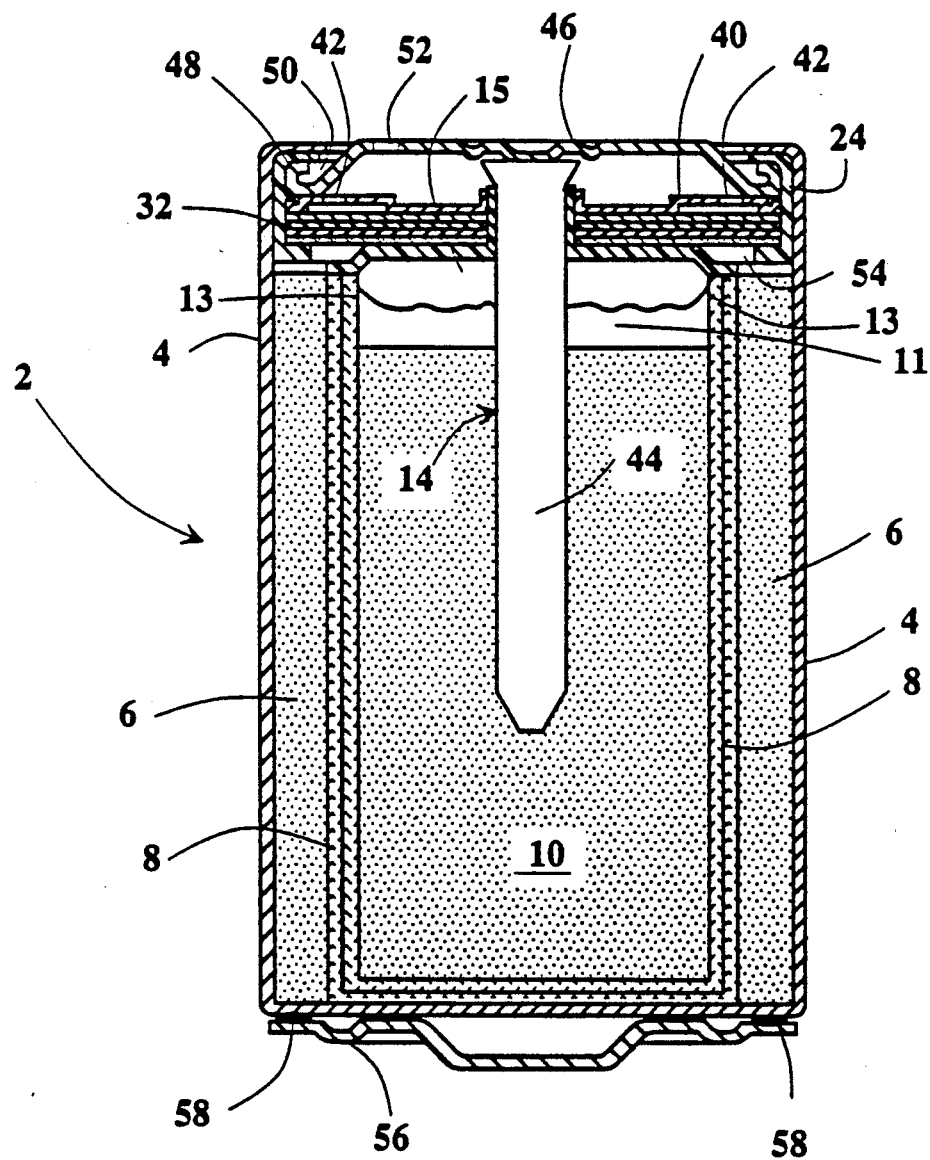
FIG. 1 is a cross sectional view of an inverted air-assisted alkaline cell of the present invention.

Referring to FIG. 1, the air-assisted alkaline cell 2 is assembled in a conventional conductive steel container 4 which also forms an external terminal for the cell. The cathode 6 for cell 2 is a mixture of porous manganese dioxide and a conductor such as acetylene black or graphite. A good source of highly porous manganese dioxide is so-called chemically synthesized manganese dioxide or CMD. CMD is usually marketed with a porosity of 25% to 35%. However, CMD can be prepared in the form of very porous spheres having a porosity of approximately 60%. The porous spheres have a substantial amount of surface available for reaction with oxygen in an air-assisted cell. To increase the total energy capacity of an air-assisted cell in an air-free environment, substantially solid $MnO_2$ must be available for the cell reaction. A good source of substantially solid $MnO_2$ is electrolytically deposited $MnO_2$ or EMD. EMD can be obtained in the form of dense particles after the electrolytically deposited material is stripped from the electrodes, crushed and screened. EMD has a porosity of approximately 10%–16% and therefore is a substantially solid material. As the ratio of EMD to CMD increases, the cell's air-free capacity also increases. The amount of CMD and EMD used in the cathode of the cell depends on the desired parameters of the cell with, for example, more or less CMD being used per cathode depending on the energy capacity desired in the presence of air. For a good cell capacity in an air-free environment and good rechargeability in an environment containing air, a mixture of 1:5, that is, one part by weight of CMD to five parts by weight of EMD is preferred.

After the cathode 6 is formed in the container 4 a separator 8 is added to physically isolate the anode material 10 from the cathode 6 and the container 4 while still permitting ion transport between the electrodes. The separator 8 could be made of two strips of separator material arranged perpendicular to one another and inserted into the cathode's tubular shape 6 forming a separator basket with a central opening. The anode mix 10 is then added to the separator lined cavity of the cell. The anode mix 10 comprises a mixture of zinc powder, a surfactant such as Triton X-100 manufactured by Union Carbide Corp., a gel forming binder and a liquid electrolyte used in the cell. The preferred binder is Carbopol 940 which is a carboxy polymethylene polymer available from the B. F. Goodrich Company, of Cleveland, Ohio. The preferred electrolyte is an aqueous solution of potassium hydroxide.

In an air-assisted cell 2, the discharged active cathode 6, that is the manganese dioxide, undergoes a reaction with the air in the cell and with air which can enter the cell, to become recharged thereby reoxidizing the reduced manganese oxide to manganese dioxide. In the discharge of the alkaline cell, the manganese dioxide is reduced to a lower oxidation state. The oxygen in the air will spontaneously restore or regenerate the higher oxidation state over a period of time. If the cell is subjected to brief periods of high rate discharge, then the cell must be rested for substantial periods of time between each discharge to enable the air to completely recharge the $MnO_2$. However, if the cell is continuously discharged at a rate which is less than the rate at which the $MnO_2$ is recharged by the incoming air, then the air recharges the $MnO_2$ as quickly as it is discharged. In other words, regardless of the rate at which the cell is discharged, if the cell is drained at a low rate or is rested for a sufficient period of time, then the cathode's ability to be recharged is limited only by its access to air. The cathode material is regenerated without involving the zinc anode material. The zinc is oxidized during the discharge but it cannot be regenerated during a rest period. In view of this, less cathode material needs to be added to an air-assisted alkaline cell and, in turn, the volume of zinc can be increased in the cell to increase the overall capacity of the cell. Returning again to a discussion of FIG. 1, the alkaline electrolyte solution is approximately a 34% to 40% by weight solution of potassium hydroxide in water and is contained in the anode mix 10. A gel top coat 11 is deposited on top of anode 10 and up along the inner wall 13 of separator 8 by any conventional manner. An open area 15 is left in the cell to provide room for expansion of the anode mix 10. A subassembly 12 as shown in FIG. 2 is used to close cell 2 as shown in FIG. 1. The subassembly 12 consists of an anode current collector nail 14 made from an electronically conducting metal. A seal member 16 is made of an organic polymeric material which is compatible with the components of cell 2 with the preferred material being polypropylene. The seal member 16 has a substantially flat bottom portion 18 surrounding an upstanding inner wall 20.

A plurality of circumferentially spaced spokes 22 extend from the periphery of the bottom portion 18 out to and below a peripheral upstanding wall 24 extending upwardly away from bottom portion 18. The spaces 26 between the spokes 22 provide a passage for air to pass through the seal member 16.

A multilayer film 32 fits within the area of the seal member 16 bounded by the peripheral wall 24 and inner wall 20. The multilayer film is made of two layers of polytetrafluoroethylene 28 sandwiched between two layers of an organic polymeric material such as polypropylene 30. The multilayer film 32 is ultrasonically welded at peripheral area 34 and inner area 36 producing a sealed multilayer assembly. If desired, the top layer 30 could have spaced apart openings to permit the inner film 28 to expand with minimum resistance or restriction. The multilayer film 32 can be fastened to the bottom 18 and the spokes 22 by welding, if desired. A fatty polyamide adhesive, such as the type disclosed in U.S. Pat. No. 3,922,178 can be used to backup the weld and to prevent electrolyte creep between the polypropylene seal 16 and the porous multilayer film 32. Two beads of the adhesive can be used. One bead is placed around the periphery of the bottom 18 where it joins the inside of peripheral wall 24 and the second bead can be placed on the bottom 18 where it joins the inner upstanding wall 20. To further ensure that the porous multilayer film 32 stays in position, concentric raised ridges 38 can be formed on the bottom 18 of the seal 16. The multilayer film 32 will then be secured between ridges 38 on the bottom 18 and the neutral cover 40. The vented neutral cover 40 is made of stainless steel and has a pair of spaced apertures 42 therein to allow the passage of air into the cell. The vented neutral cover 40 will fit within the area of the seal member 16 bounded by the peripheral wall 24. A conductive current collector nail 14, preferably made of indium coated brass and having a thinned portion 44 which can be inserted into and through subassembly 12 to maintain the parts together. The dimensions of the several components of the subassembly 12 and of the overall cell can be varied to meet particular size requirements for the type of cell being assembled.

The subassembly 12 is inserted into the bottom of the inverted cell as shown in FIG. 1. The peripheral wall 24 of the seal member 16 insulates the neutral cover 40 from electrical contact with the container 4. To complete assembly of the cell, a bottom cover 46 is placed into the steel container 4 and is also insulated from contact with the container 4 by the peripheral wall 24 of seal member 16. The bottom cover 46 makes electrical contact with the nail 14, or other suitable electrically conductive means, enabling the bottom cover 46 to become the second external terminal for cell 2. The edge of the steel container 4, and of the subassembly 12, are then rolled to hold the upturned portion 48 of the bottom cover 46 locked in position on the bottom of the cell 2. A gap 50 surrounds the bottom cover 46, separating it from contact with the container 4. The bottom cover 46 contains one or more apertures 52, one of which is shown in FIG. 1, which provide a passage for air to enter into the bottom of the cell 2. The air can pass through the subassembly 12 and contact the top portion of the cathode 6 through the air passage 54. The top cover 56 can be fastened to the container by welds 58 after the cathode is rammed into place. It can be added before or after this step as it is merely attached to the container 4.

In the preferred embodiment of this invention the zinc-containing anode would contain less than 0.1 weight percent mercury along with a surfactant of about 300 to 10,000 ppm Triton X-100 as based on the weight of the zinc. The separator would be a BCL Cellophane separator along with a French potato starch as the gel top coat for the anode. Preferably no mercury would be added to the anode.

Though the invention has been described with respect to preferred embodiments thereof, many variations and modifications will become apparent to those skilled in the art. It is therefore the intention that the appended claims be interpreted as broadly as possible in view of the prior art to include all such variations and modifications.

What is claimed is:

1. An air-assisted cell comprising an anode, a cathode and an electrolyte assembled within a container closed by a cover having at least one opening and said cover associated with a film being porous to permit air from the at least one opening in the cover to enter the cell while preventing electrolyte from exiting the at least one opening in the cover during normal operating and storage conditions; said cathode disposed within and electrically connected to the container and defining a cathode opening in said cathode; a separator member disposed within said cathode opening and contacting said cathode and defining a separator opening in said separator; said anode disposed within said separator opening in the separator with the separator extending above the anode and wherein said separator is permeable to hydrogen and substantially nonpermeable to said electrolyte, said separator having a characteristic such that when the separator is placed within a 2.76 inch inside diameter tube to a thickness of 0.0045 inch filling the cross-section of the tube, 50 cubic centimeters of a 37% potassium hydroxide solution placed on one side of the separator in the tube will take more than 5 minutes to pass through the separator when a vacuum of 750 mm Hg is applied to the other side of the separator in the tube.

2. The air-assisted cell of claim 1 wherein the 37% potassium hydroxide solution will take more than 8 minutes to pass through the separator.

3. The air-assisted cell of claim 1 wherein the separator is selected from the group consisting of cellophane, nylon, rayon, polyvinyl alcohol and cellulose.

4. The air-assisted cell of claim 1 wherein a gel material that is substantially nonpervious to the electrolyte and substantially pervious to hydrogen is disposed over the exposed area of the anode encased in the separator.

5. The air-assisted cell of claim 4 wherein the gel material is selected from the group consisting of French potato starch, grain starch, polymethacrylic acid, polyacrylic acid and salts of polyacrylic acid.

6. The air-assisted cell of claim 4 wherein the separator is selected from the group consisting of cellophane, nylon, rayon, polyvinyl alcohol and cellulose.

7. The air-assisted cell of claim 1 wherein the anode contains a surfactant.

8. The air-assisted cell of claim 7 wherein the surfactant is selected from the group consisting of polyethylene glycol and its derivatives.

9. The air-assisted cell of claim 7 wherein the separator is selected from the group consisting of nylon, rayon, polyvinyl alcohol and cellulose.

10. The air-assisted cell of claim 7 wherein a gel material that is substantially nonpervious to the electrolyte and substantially pervious to hydrogen is disposed over the exposed area of the anode encased in the separator.

11. The air-assisted cell of claim 10 wherein the gel material is selected from the group consisting of French Potato starch, grain starch, polymethacrylic acid, polyacrylic acid and salts of polyacrylic acid.

12. The air-assisted cell of claim 1 wherein the anode comprises a zinc-containing anode, the cathode comprises a manganese dioxide-containing cathode and the electrolyte comprises a potassium hydroxide-containing solution.

13. The air-assisted cell of claim 12 wherein the anode contains less than 3 weight percent mercury based on the weight of the zinc.

14. The air-assisted cell of claim 13 wherein the anode contains less than 0.1 weight percent mercury based on the weight of the zinc; wherein a gel material that is substantially nonpervious to the electrolyte and substantially pervious to hydrogen is disposed over the exposed area of the anode encased in the separator; and wherein the anode contains a surfactant.

15. The air-assisted cell of claim 14 wherein the separator comprises cellophane.

16. The air assisted cell of claim 15 wherein the gel comprises French potato starch.

17. The air-assisted cell of claim 16 wherein the surfactant is polyethylene glycol or at least one derivative thereof.

18. An air-assisted cell comprising a zinc-containing anode; a manganese dioxide-containing cathode and a potassium hydroxide-containing electrolyte assembled within a container closed and electrically insulated from a cover having at least one opening and said opening in the cover being associated with a film being porous to permit air from the opening to pass through into the cell and prevent the electrolyte from exiting through the opening in the cover; said cathode disposed within and electrically connected to said container and defining a cathode opening in said cathode; a separator member disposed within said cathode opening contacting the cathode and defining a separator opening in said separator; said anode disposed within said separator opening in the separator with the separator extending above the anode, said separator being substantially nonpervious to the electrolyte and substantially pervious to hydrogen; a gel material that is substantially nonpervious to the electrolyte and substantially pervious to hydrogen is disposed over the exposed area of the anode encased in the separator; and said anode contains an effective amount of a surfactant.

19. The air-assisted cell of claim 18 wherein said anode contains less than 0.1 weight percent mercury based on the weight of the zinc.

20. The air-assisted cell of claim 19 wherein said separator is cellophane; said gel is French potato starch; and said surfactant comprises polyethylene glycol.

* * * * *